(No Model.) 2 Sheets—Sheet 1.
J. LEIGHTHAM.
CAR FENDER.
No. 542,481. Patented July 9, 1895.
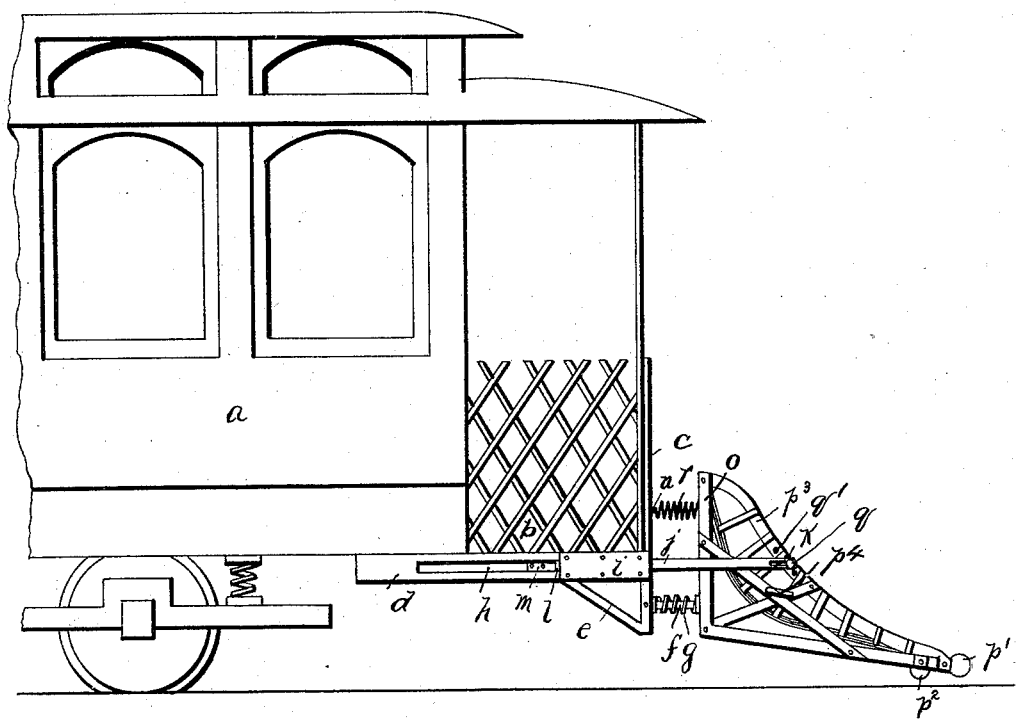
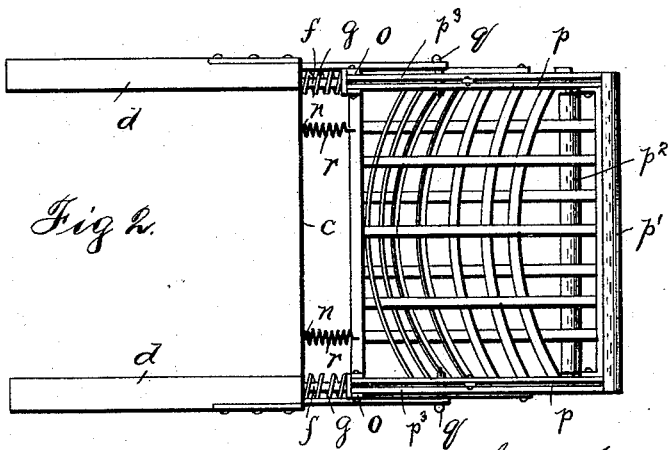
Witnesses
E. Callan Duffy
Leo Jerome Lally
Inventor
Joseph Leightham
per O. E. Duffy
Attorney (No Model.) 2 Sheets—Sheet 2.

J. LEIGHTHAM.
CAR FENDER.

No. 542,481. Patented July 9, 1895.

Witnesses:
E. Callan Duffy
Leo Jerome Lally

Inventor
Joseph Leightham
per O. E. Duffy
Attorney

United States Patent Office.

JOSEPH LEIGHTHAM, OF READING, PENNSYLVANIA, ASSIGNOR OF ONE-HALF TO WILLIAM H. SLICHTER, OF SAME PLACE.

CAR-FENDER.

SPECIFICATION forming part of Letters Patent No. 542,481, dated July 9, 1895.

Application filed April 8, 1895. Serial No. 545,026. (No model.)

*To all whom it may concern:*

Be it known that I, JOSEPH LEIGHTHAM, of Reading, in the county of Berks and State of Pennsylvania, have invented certain new and useful Improvements in Car-Fenders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in street-car fenders.

The object of the invention is to provide an improved automatically-acting fender, simple, durable, and economical in construction, and exceedingly effective in action in picking up fallen persons and preventing injury to persons struck by the vehicle.

A further object of the invention is to provide an improved construction of street-car fender which can be easily removed from the car and placed at either end thereof, and which is yieldingly connected with the car.

The invention consists in certain novel features of construction and in combinations and arrangements of parts more fully and particularly pointed out and described hereinafter.

Figure 3:
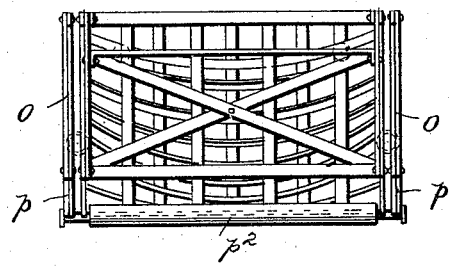
Figure 4:
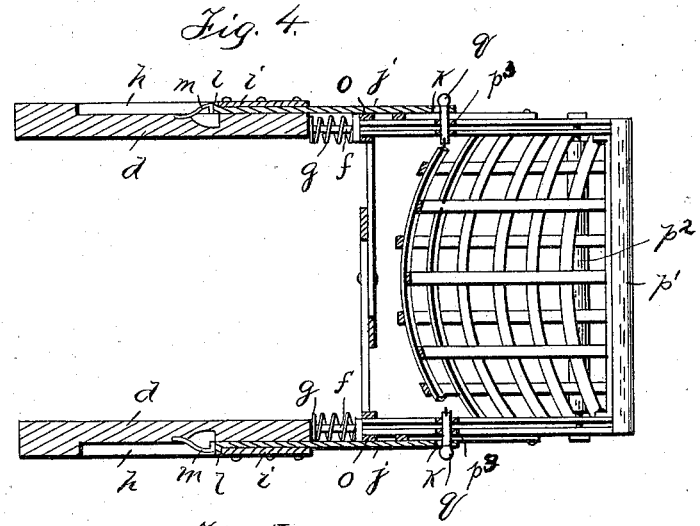
Figure 5:
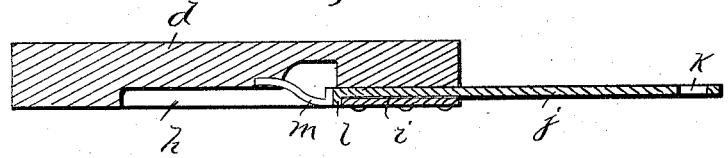

Referring to the accompanying drawings, Figure 1 is a side elevation showing the front portion of the car provided with the improved fender. Fig. 2 is a top plan of the fender, showing the beams of the car supporting the platform and the manner of supporting the fender therefrom. Fig. 3 is a rear end view of the fender. Fig. 4 is a horizontal section through the upper part of the fender and the supporting bars and beams of the car to which they are secured, the car not being shown. Fig. 5 is a horizontal enlarged detail section through a supporting-bar and a car-beam.

In the drawings, $a$ is the vehicle, having the usual platform $b$ and dash $c$.

$d$ are the forwardly-extending beams beneath the platform and sustaining the same.

$e$ are strong rigid depending brackets from the under side of the front end of the platform. Each bracket, on its front side, is provided with vertically-swinging guide-pins $f$, having a head pivoted in the bracket, so that the pin can drop down to the vertical position or extend directly forward as when in operative position. Each pin has a heavy expansive coiled spring $g$ secured thereon. The said platform-supporting beams are provided on their outer sides with the longitudinal sockets or ways $h$, closed on the outer sides by plates $i$. The supporting-bars $j$ are confined in these sockets and extend forwardly a suitable distance beyond the front end of the car, and at their front ends are provided with the longitudinal slots $k$. At the rear ends of said plates the said bars are provided with lips $l$, forming stops which prevent the forward movement on the bars.

$m$ are spring-plates engaging the rear ends of the said supporting-bars and normally holding the same against rearward longitudinal movement; but these springs are so formed that they can be pressed inwardly by hand or otherwise, so that the supporting-bars can be moved longitudinally over them when the fender is removed and it is not desired to have the supporting-bars projecting beyond the front end of the vehicle.

$n$ are eyes arranged rigidly on the front side of the dash.

Both ends of the car are preferably constructed in the manner as just described, so that the fender, to be hereinafter set forth, can be applied at either end.

The fender is approximately triangular in edge view, with the rear upright frame $o$ extending upwardly in front of the dash from a point below the dash and platform and the forwardly and downwardly extending bottom frame $p$, having its front end normally arranged a distance above the roadway.

This front bar of the fender has a transverse heavy bed or cushion $p'$, and on its under side, a short distance back, is provided with the rotary shaft $p^2$, extending entirely across the fender and mounted in the sides thereof. This shaft is normally a distance above the surface of the roadway, but when the fender is depressed travels on the roadway and holds other parts up out of engagement therewith.

$p^3$ are the side bars of the fender, extending forwardly and downwardly from the upper end of the rear frame to the lower front end of the bottom frame.

The fender can be closed in to form a scoop or receptacle by any suitable means, such as cross and longitudinal bands or slats of sufficient flexibility to prevent injury to persons falling thereon.

Suitable braces can be employed to strengthen the fender and can be provided with side handles $p^4$ to facilitate handling.

The fender is pivoted to the outer ends of the two supporting-bars and is arranged between them so as to be nearly balanced, but preferably with the pivots a short distance in rear of the central gravity, so that the front end of the fender has a slight tendency to drop.

$q$ are the pivots passed through the slots in the supporting-bars, confined therein, and removably joined to the side bars of the fender. A series of holes $q'$ can be provided in the side bars for these pivot-pins, so that the fender can be adjusted and mounted as desired.

$r$ are retractive coiled springs loosely joined to the upper rear cross-bar of the rear fender-frame, with hooks or other means at their free ends, so that these springs can be detachably secured to the eyes $n$ of the car-dash.

The swinging guide-pins, before described, extend loosely through the lower portion of the rear frame of the fender, with their heavy coiled spring interposed between said rear frame and the depending brackets $e$, so as to yieldingly hold the fender in its normal position in conjunction with the upper springs just mentioned.

It will thus be observed that the fender is yieldingly held at all points, and that it has a slight rearward movement bodily independent of its swinging movement, and that the front bar of the fender when striking obstructions will be so depressed as to pick up the body and deposit it in the fender without heavy blows or jars.

The fender can be easily removed by unhooking the upper springs from eyes $n$ and removing the pivot-bolts $q$. The fender can then be moved from the car, and the guiding-pins $f$, with their springs, will drop down from the fender.

The extreme simplicity and durability of this fender and its peculiar advantages and utility are obvious without further elucidation.

It is evident that various changes might be made in the forms, arrangements, and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. The fender comprising the rear frame and the forwardly and downwardly extending bottom frame with the sides, said fender pivotally joined at its sides to the car and springs between the car and the rear end of the fender above and below the pivotal points of the fender, substantially as described.

2. The fender removably pivoted to the car and having the retractive spring removably connecting the upper part of the rear end of the fender and the dasher, and the springs between the lower part of the fender and the car and removable from the fender, substantially as described.

3. The fender extending up in front of the dash and downwardly and forwardly below the dash, expansive springs interposed between the car and the lower part of the fender, and arms extending forwardly from the car and to which said fender is pivoted at its sides above the plane of said springs and a distance below its upper end, said fender having a limited longitudinal movement in addition to its swing, substantially as described.

4. A car having the longitudinal sideways at its end, spring stops therein, the sliding fender supporting bars in said ways having the longitudinal slots in their outer ends, the fender pivoted at its sides in said arms so that the pivots can slide in said slots, and springs holding the fender, substantially as described.

5. A car having the forwardly extending slidable fender supporting arms extending beneath the platform to a point in front of the dash, brackets depending from the platform and having swinging guides provided with springs, the fender pivoted at its sides in said arms and formed to receive said guides and be held by the springs substantially as described.

In testimony that I claim the foregoing as my own I affix my signature in presence of two witnesses.

JOSEPH LEIGHTHAM.

Witnesses:
HARRY J. LUTZ,
JOHN A. BUCH.